H. B. Myers,
Cage Trap,
Nº 46,379. Patented Feb. 14, 1865.
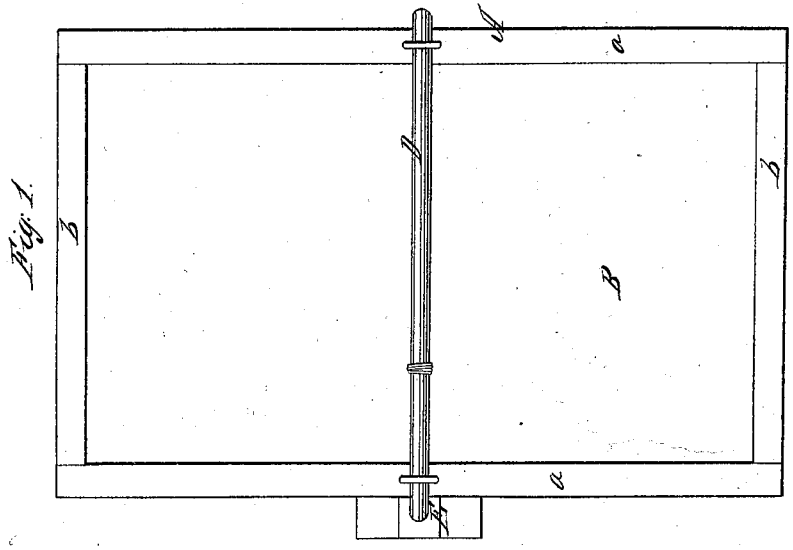
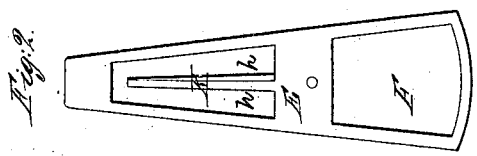
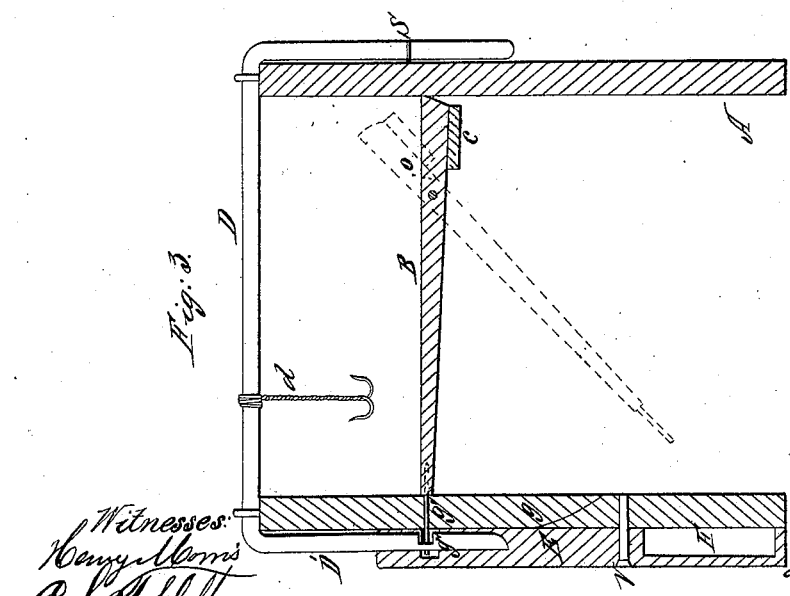
Witnesses:
Henry Morris
C. L. Topliff
Inventor:
H. B. Myers
per Munn
atty

UNITED STATES PATENT OFFICE.

H. B. MYERS, OF SCHOOLCRAFT, MICHIGAN.

IMPROVEMENT IN SELF-SETTING ANIMAL-TRAPS.

Specification forming part of Letters Patent No. 46,379, dated February 14, 1865.

*To all whom it may concern:*

Be it known that I, H. B. MYERS, of Schoolcraft, in the county of Kalamazoo and State of Michigan, have invented a new and useful Improvement in Traps for Rats and Vermin; and I do hereby declare that the following is a full, clear, and exact description thereof, which will enable others skilled in the art to make and use the same, reference being had to the accompanying drawings, forming part of this specifiation, in which—

Figure 1 represents a plan view of my trap. Fig. 2 shows an inner face view of the pendulous detent. Fig. 3 shows an elevation of a vertical section through the axis of the bent rod D'.

Similar letters of reference indicate like parts.

A in the several figures represents the trap, made of any suitable material, and of any desired shape which will not conflict with the proper working of the trap. The trap is intended to be set over a suitable receptacle to secure the vermin. The sides and ends of the box of the trap are solid and well secured to each other. The platform B moves within them, and is suspended at its ends upon pins O, secured in the ends b of the box. A weight, C, is secured to the under side of the platform, to keep it horizontal when in a state of rest.

A stud, g', is secured to one side of the platform, directly beneath the bent rod D, which, when the platform is carried down, moves through a vertical slot, g, cut through the side of the box. A rod, D, is secured within staples upon the top of the sides a of the box, which sides project a suitable distance above the platform to allow a bait-hook, d, which is firmly fixed to the rod D, to move to and fro above the platform. The rod D is bent downward at right angles against the sides a of the box, and it is free to vibrate about its points of support upon the sides of the box. To the side of the box which is slotted I fasten a pendulous detent, E, so that it will freely move about the fastening V. This detent is weighted, as shown at F, to keep it in a vertical position. The upper part of its inner face is slotted, as shown at i h h, leaving a rib, k, between the slots h, which latter are united at top by a cross-slot, i. The pendulous detent is to be loosely connected to the limb D' of the rod D, so as to slide thereon when they are in motion.

I sometimes dispense with the use of the pendulous detent by the following modification: The limb D' of the rod D is slotted across at g'', so as to form a detent or shoulder for the support of the stud of the platform. In this case I make the limbs D' and S heavy enough to answer the purpose of a pendulum.

The operation of the trap is as follows: The animal to be trapped is decoyed upon the platform by bait secured to the hook d, the platform resting in the slot g'' of the limb D' or upon the end rib, k, of the pendulous detent. So soon as the hook d is moved out of a vertical line the rod D is rocked, the stud g' of the platform loses its support, and the descent of the platform lets the animal fall into the receptacle below.

I disclaim the invention of William Biddle, patented July 12, 1839; but

I claim as new and desire to secure by Letters Patent—

The combination of the pendulous detent E, provided with the groove or channel h i h, and resetting itself by its own gravity, with the fixed bait-hook d, the weighted platform B, and the box of the trap, substantially as above described.

H. B. MYERS.

Witnesses:
C. F. WHEELER,
E. W. DYCKMAN.